US009020205B2

(12) United States Patent  
Zhdanov et al.

(10) Patent No.: US 9,020,205 B2  
(45) Date of Patent: Apr. 28, 2015

(54) METHODS OF MULTINARY INVERSION FOR IMAGING OBJECTS WITH DISCRETE PHYSICAL PROPERTIES

(71) Applicant: TechnoImaging, LLC, Salt Lake City, UT (US)

(72) Inventors: Michael S. Zhdanov, Holladay, UT (US); Leif H. Cox, Francis, UT (US)

(73) Assignee: TechnoImaging, LLC, Salt Lake City, UT (US)

( * ) Notice: Subject to any disclaimer, the term of this patent is extended or adjusted under 35 U.S.C. 154(b) by 74 days.

(21) Appl. No.: 13/974,949

(22) Filed: Aug. 23, 2013

(65) Prior Publication Data

US 2014/0056481 A1 Feb. 27, 2014

Related U.S. Application Data

(60) Provisional application No. 61/692,799, filed on Aug. 24, 2012.

(51) Int. Cl.
*G06K 9/00* (2006.01)
*G01V 11/00* (2006.01)

(52) U.S. Cl.
CPC ............ *G06K 9/00624* (2013.01); *G01V 11/00* (2013.01)

(58) Field of Classification Search
None
See application file for complete search history.

(56) References Cited

U.S. PATENT DOCUMENTS

| 2010/0185422 A1* | 7/2010 | Hoversten | 703/2 |
| 2012/0259601 A1* | 10/2012 | Fuck et al. | 703/2 |
| 2013/0176822 A1* | 7/2013 | Thore et al. | 367/73 |

* cited by examiner

*Primary Examiner* — Atiba O Fitzpatrick
(74) *Attorney, Agent, or Firm* — Workman Nydegger

(57) ABSTRACT

A method of multinary inversion for imaging objects with discrete physical properties of the examined medium is described. The model parameters of the target area are parameterized in terms of a multinary function of the physical properties that accepts a finite number of discrete values from the continuum of at least one physical property. The multinary function is chosen such that the derivative of the multinary function with respect to the physical property is a continuous and known function. The imaging is based on solving the optimization problem for parametric functional of the multinary functions describing the target model parameters. The method can be applied for multi-modal imaging, such that at least one physical property representing the physical properties of the examined medium, may be derived to provide a reconstruction or classification of the physical properties of the examined medium.

20 Claims, 6 Drawing Sheets

METHODS OF MULTINARY INVERSION FOR IMAGING OBJECTS WITH DISCRETE PHYSICAL PROPERTIES

CROSS-REFERENCE TO RELATED APPLICATIONS/PUBLICATIONS

This application claims the benefit of and priority to U.S. Provisional Patent Application No. 61/692,799 filed Aug. 24, 2012, the entirety of which is hereby incorporated by reference.

This application also hereby incorporates the following publications by reference in their entireties: Cox, L. H., Wilson, G. A., and Zhdanov, M. S., 2012, 3D inversion of airborne electromagnetic data, Geophysics, vol. 77, no. 4, pp. WB59-WB69. Zhdanov, M. S., 2002, Geophysical inverse theory and regularization problems: Elsevier, Amsterdam. Zhdanov, M. S., Ellis, R. G., and Mukherjee, S., 2004, Three-dimensional regularized focusing inversion of gravity gradient tensor component data, Geophysics, vol. 69, no. 4, pp. 925-937. Zhdanov, M. S., 2009, Geophysical electromagnetic theory and methods: Elsevier, Amsterdam. Zhdanov, M. S., Gribenko, A. V., and Wilson, G. A., 2012, Generalized joint inversion of multimodal geophysical data using Gramian constraints, Geophysical Research Letters, vol. 39, L09301, doi: 10.1029/2012GL051233.

BACKGROUND OF THE INVENTION

1. The Field of the Invention

The present disclosure relates in general to the imaging of different physical properties of geological formations, human and/or animal bodies, and/or man-made objects. The present disclosure can be applied to geophysical imaging, medical imaging, nondestructive imaging, and remote sensing.

2. The Related Technology

Methods of geophysical, medical, and nondestructive imaging are based on parameterizing models in terms of physical properties that can predict the observed data so as to minimize a parametric functional with both misfit and stabilizing functional terms. Given the ill-posedness of the inverse problems encountered in geophysical, medical, and nondestructive imaging, a variety of regularization methods are introduced to obtain unique and stable inverse solutions. The state-of-the-art in inverse problem solution and regularization theory is detailed by Zhdanov, 2002, 2009.

Conventional inverse methods characterize the model parameters of an examined medium by a function of the physical properties which varies continuously within known bounds, which in some applications, may be inadequate for imaging objects with discrete physical properties.

In many practical applications, the goal of inversion is to find at least one target with sharp boundaries and strong physical property contrasts between the targets and the host medium. For example, there exists a significant physical property contrast between an air-filled tunnel and surrounding earth, or between a defect within a concrete or metal fabrication and the surrounding medium, or between a diseased human heart or bone or malignant tumor and other human tissue and bone.

Conventional inversion methods cannot be used to image objects with discrete physical properties, because parameterization with discrete physical properties prevents differentiation of the observed data with respect to the physical properties, thus preventing the use of efficient gradient-based optimization methods. Rather, stochastic optimization methods could be used, but stochastic optimization methods involve computationally intensive modeling, which makes them inefficient or even impractical to implement, particularly for real-time imaging applications.

For geophysical, medical, and nondestructive imaging, particularly for real-time applications and/or where the inverse problem is highly constrained by known physical property values, there exists a need to develop an imaging method that parameterizes the models in terms of discrete physical properties yet enables the use of efficient gradient-type optimization methods, thus preserving all of the established advantages of regularized imaging methods.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
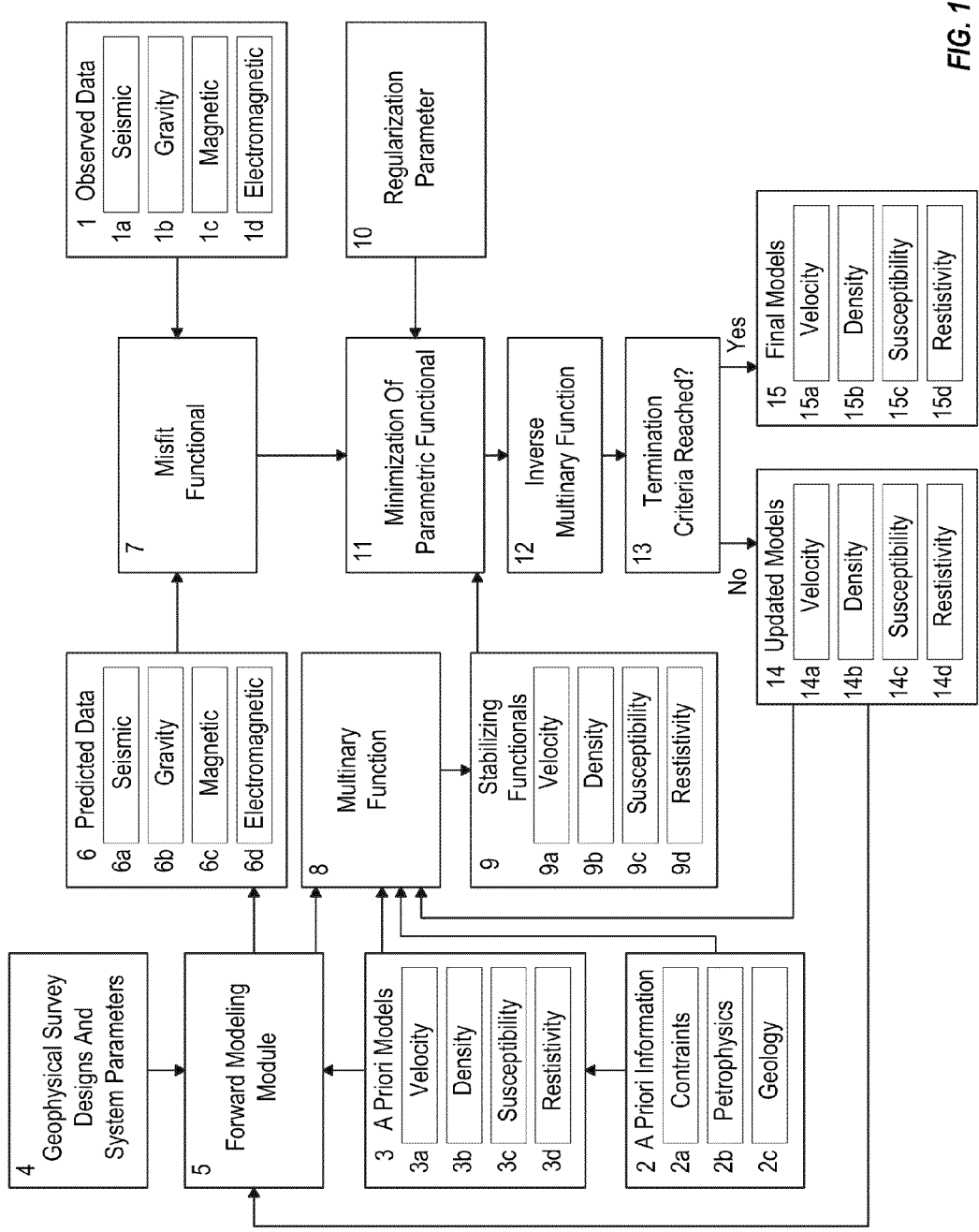
FIG. 1 illustrates an embodiment of a method of multinary inversion for imaging an examined medium with discrete physical properties.

Exemplary embodiments of the invention will become more fully apparent from the following detailed description and appended claims, taken in conjunction with the accompanying drawings. It is understood that this discussion describes only exemplary embodiments and are, therefore, not to be considered limiting of the invention's scope.

At least one embodiment of a method disclosed herein is based on introducing multinary functions describing discrete physical properties attributed to an object. The discrete physical property category is defined by a minimum physical property value and a maximum physical property value, and may be defined by other functions of the physical property values, such as the mean of the physical property values and the standard deviation of the physical property values. A multinary function is defined as a function that accepts a finite number of discrete values from the continuum of physical property values. The finite number of discrete values defines the model parameters of the inverse problem.

In at least one embodiment of this method, the multinary function is chosen such that the derivative of the multinary function with respect to the physical property is a continuous and known function. The model parameters of the inverse problem are analytically differentiable with respect to the physical properties, enabling the Fréchet derivatives of the inverse problem to be evaluated analytically.

Another embodiment of the method disclosed herein is based on using deterministic (gradient-based) and/or stochastic optimization methods to minimize the parametric functional of the inverse problem.

An important characteristic of the method disclosed herein is that an inverse transform exists to transform the discrete model parameters described by the multinary function to the physical properties for delivering intermediate and/or final images of the physical properties, and for calculating model responses and Fréchet derivatives. The inverse transform is chosen such that the physical properties are a continuous function of the model parameters.

In at least one embodiment of this method, the physical properties are assigned within discrete physical property categories for delivering intermediate and/or final images of the discrete physical property categories.

In at least one embodiment of this method, a priori information can be applied to the spatial distribution of the discrete physical property categories within the model. For example, in geophysical imaging, the different discrete physical property categories may relate to different lithological units that obey geological rules to satisfy the chronological order of a stratigraphic column.

At least one embodiment of this method can be used for multi-modal imaging of different types of geophysical data, including but not limited to seismic, electromagnetic, electrical, magnetic, gravity, and nuclear geophysical data.

At least one embodiment of this method can be used for multi-modal imaging of different types of medical data, including but not limited to x-ray, magnetic resonance, ultrasound, electrical, and nuclear medical data.

At least one embodiment of this method can be used for multi-modal imaging of different types of non-destructive testing data, including but not limited to acoustic, electromagnetic, electrical, magnetic, and nuclear non-destructive testing data.

At least one embodiment of this method can be used for multi-modal imaging of different types of remote sensing data, including but not limited to radar and sonar data.

At least one embodiment of this method can be applied to the inversion of data to recover physical property models.

At least one embodiment of this method can be applied to the migration of data to recover physical property models.

At least one embodiment of this method can be applied to the tomographic imaging of data to recover physical property models.

At least one embodiment of this method can be applied to the holographic imaging of data to recover physical property models.

At least one embodiment of this method can be used in geophysical exploration for mineral, hydrocarbon, geothermal, and groundwater resources, and for atmospheric, oceanographic, and solid earth processes.

At least one embodiment of this method can be used in geophysical monitoring for in-situ mineral, hydrocarbon, geothermal, and groundwater resources, and for atmospheric, oceanographic, and solid earth processes.

At least one embodiment of this method can be used for detecting unexploded ordinance (UXO) and improvised explosive devices (IED).

At least one embodiment of this method can be used for detecting tunnels and underground facilities (UGFs).

At least one embodiment of this method can be used for geosteering.

At least one embodiment of this method can be used for formation evaluation and/or logging-while-drilling (LWD) and/or measurement-while-drilling (MWD) and/or imaging-while-drilling (IWD).

At least one embodiment of this method can be used for mapping bathymetry in shallow and/or temporal and/or turbid water.

At least one embodiment of this method can be used for mapping ice thickness.

At least one embodiment of this method can be used for environmental monitoring, such as salinity, acid mine drainage, and pollution plumes.

At least one embodiment of this method can be used for medical imaging of human and/or animal bodies and/or tissue.

At least one embodiment of this method can be used for nondestructive imaging, testing, and evaluation.

At least one embodiment of this method can be used for through-wall imaging.

At least one embodiment of this method can be used for radar imaging.

At least one embodiment of this method can be used for sonar imaging.

At least one embodiment of this method can be applied in real-time.

Figure 6A:
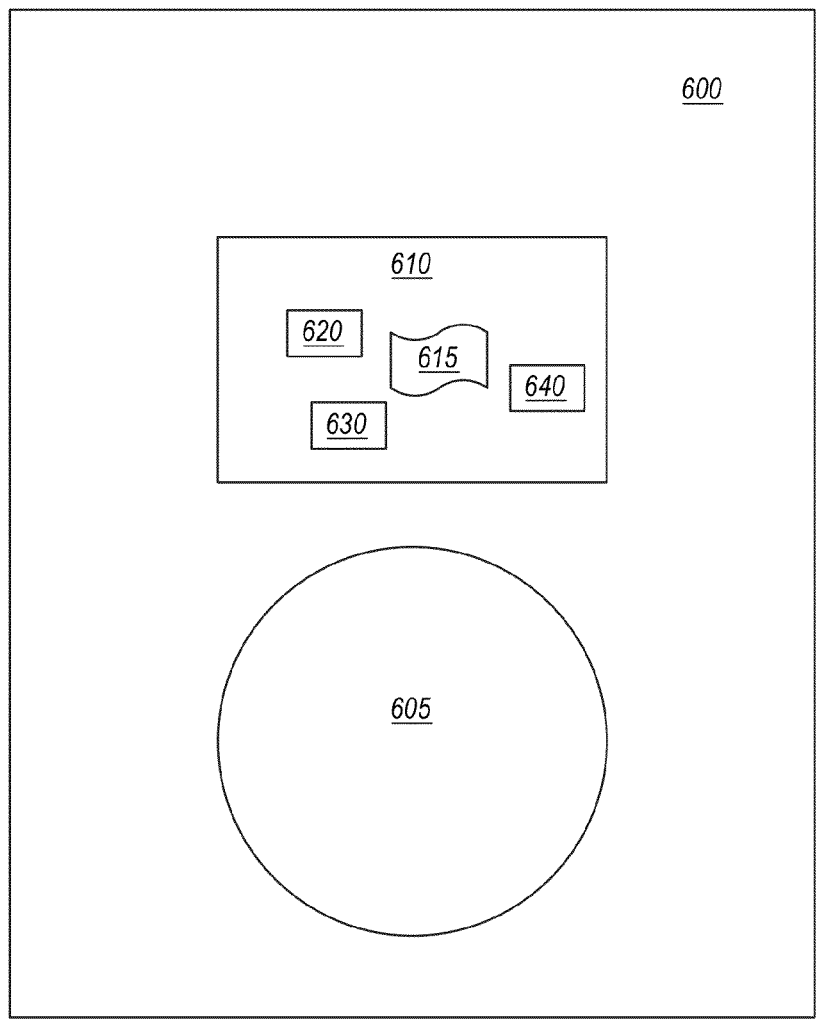
FIG. 6a illustrates an operating environment for performing the embodiments disclosed herein.

Attention is first given to FIG. 6A, which illustrates an operating environment 600 for performing embodiments disclosed herein. As illustrated, the environment 600 includes a data acquisition system 610 that is placed in proximity to an examined target medium 605. The examined target medium 605 may include geological formations and/or a human and/or animal body and/or a man-made object. It will be appreciated that the examined target medium 605 may be any reasonable medium. The examined target medium 605 may be characterized by different physical properties including one or more of conductivity, permeability, induced polarization parameters, density, magnetization, magnetic susceptibility, compressional wave velocity, shear wave velocity, and/or any combination thereof.

The data acquisition system 610 may include one or more sensors 620 that are operable to measure data 615 related to the examined target medium 605. As mentioned previously, the data 615 may relate to various types of data including, but not limited to, geophysical data, medical imaging data, non-destructive testing data, remote sensing data, and any other reasonable data. The data 615 may also include multi-modal data representing different physical properties of the target medium 605 including one or more of electrical conductivity, dielectric permittivity, induced polarization parameters, density, magnetization, susceptibility, compressional wave velocity, acoustic impedance, and/or shear wave velocity, and/or any combination thereof representing the physical properties of the examined target medium.

The data acquisition system 610 may also include a computing system 630 and an image rendering unit 640. In some embodiments, the computing system 630 and/or image rendering unit 640 may be located adjacent the sensors 610, while in other embodiments the computing system 630 and/or image rendering unit 640 may be remote. In operation, the computing system 630 and/or image rendering unit 640 may include various modules and operational units operable to generate images of the target medium 605 based on the measured data 615 as will be explained in more detail to follow.

Figure 6B:
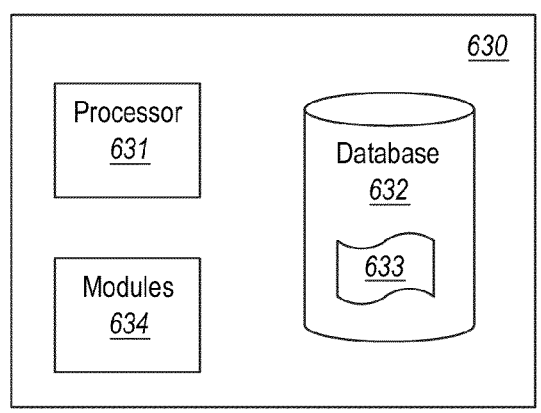
FIG. 6b illustrates an example computing system for performing the embodiments disclosed herein.

For example, FIG. 6B illustrates an example embodiment of the computing system 630. As illustrated, the computing system 630 includes a processor 631, which may be any reasonable processor. The computing system also includes a database 632, which may be any reasonable volatile or non-volatile memory. It will be appreciated that the database 632 is an example of a physical, non-transitory computer readable medium. The database 632 may store computer readable instructions 633 that, when executed by the processor 631, cause the computing system 630 or any of the other elements of the data acquisition system to perform various operations as will be described in more detail to follow. The computing system 631 also includes various modules that allow the computing system to perform various measurement and other operations.

Turning now to FIG. 1, this figure illustrates a process flow of one embodiment of a method of multinary inversion of physical data for imaging objects with discrete physical properties performed by the data acquisition system 610. In the process flow, observed data 1 may be measured by the sensors 620 of the data acquisition system 610 in the proximity of the target 605, and may be inclusive of seismic 1a and/or gravity 1b and/or magnetic 1c and/or electromagnetic 1d data. It will be appreciated that other types of data may also be observed and measured.

In the process flow, a priori information about physical parameters or properties 2 of the target medium 605 can be introduced from, for example, physical constraints 2a and/or petrophysics 2b and/or geology 2c. In addition, a priori models 3 of the physical properties 2 may be constructed, and may be inclusive of velocity 3a and/or density 3b and/or susceptibility 3c and/or resistivity 3d models. It will be appreciated that other types of a priori models 3 may also be utilized as circumstances warrant.

In the process flow, the a priori models 3 are utilized in association with knowledge of geophysical survey designs and acquisition system 610 parameters 4 to emulate the geophysical survey and acquisition system 610 with forward modeling 5. In addition, the forward modeling 5 computes predicted data 6 and Fréchet derivatives of the acquisition system 610. The predicted data may be related to predicted seismic data 6a, gravity data 6b, magnetic data 6c, and electromagnetic data 6d. A misfit functional 7 calculates a residual vector between the observed data 1 and the predicted data 6.

In the process flow, a priori information about the physical properties 2 is used to select an appropriate multinary function 8. The multinary function 8 transforms the physical properties 2 into discrete values which are used as the model parameters in an inversion operation. The physical properties 2 may be continuous. The multinary function 8 acts upon the physical properties 2 of the a priori models 3 and updated models, as well as the Fréchet derivatives calculated from the forward modeling 5.

In the process flow, stabilizing functionals 9 are calculated, and may include any smooth or focusing stabilizing functions such as Laplacian, minimum gradient, minimum norm, minimum support, or minimum gradient support, and any multimodal terms required for joint inversion. The stabilizing functionals 9 may also be related to velocity 9a, density 9b, susceptibility 9c, and resistivity 9d.

In the process flow, a regularization parameter 10, which may provide balance (or bias) between the misfit and stabilizing functionals, is defined by an algorithm. A parametric functional, which may be formed by a linear combination of the misfit and stabilizing functionals, is minimized using a linear or nonlinear optimization method 11, such as a reweighted regularized conjugate gradient method.

In the process flow, the inverse of the multinary function 12 is applied to an intermediate and final model so as to recover updated physical property models 14 or final physical property models 15. Termination criteria 13 of the multinary inversion 12, such as a predetermined misfit being achieved, is evaluated. If the termination criteria 13 are not satisfied, the model parameters are updated as updated model parameters 14, and the aforementioned multinary inversion process is reiterated. The updated model parameters 14 may be related to velocity 14a, density 14b, susceptibility 14c, and resistivity 14d. If the termination criteria are satisfied, the model parameters are updated as final model parameters 15, and the multinary inversion process is terminated. The final model parameters 15 may be related to velocity 15a, density 15b, susceptibility 15c, and resistivity 15d.

In all embodiments of the method disclosed herein, physical properties may include but not be limited to conductivity, permittivity, density, susceptibility, magnetization, compressional wave velocity, shear wave velocity, and thermal conductivity, and/or any combination thereof such as acoustic impedance. In all embodiments of the method disclosed herein, the terms conductivity and resistivity can be interchanged without any loss of meaning or generality. Due to physical-chemical polarization processes that accompany electrical current flow, the electrical conductivities of materials such as rocks and/or fluids are a complex, frequency-dependent function. At least one embodiment of a method disclosed herein can be applied to any combination of the conductivity and/or permittivity and/or induced polarization relaxation terms such as but not limited to chargeability and/or time constant and/or frequency constant.

EXAMPLE 1

The following is an example of at least some of the principles of multinary inversion that is offered to assist in the practice of the disclosure. It is not intended thereby to limit the scope of the disclosure to any particular theory of operation or to any field of application.

Figure 2:
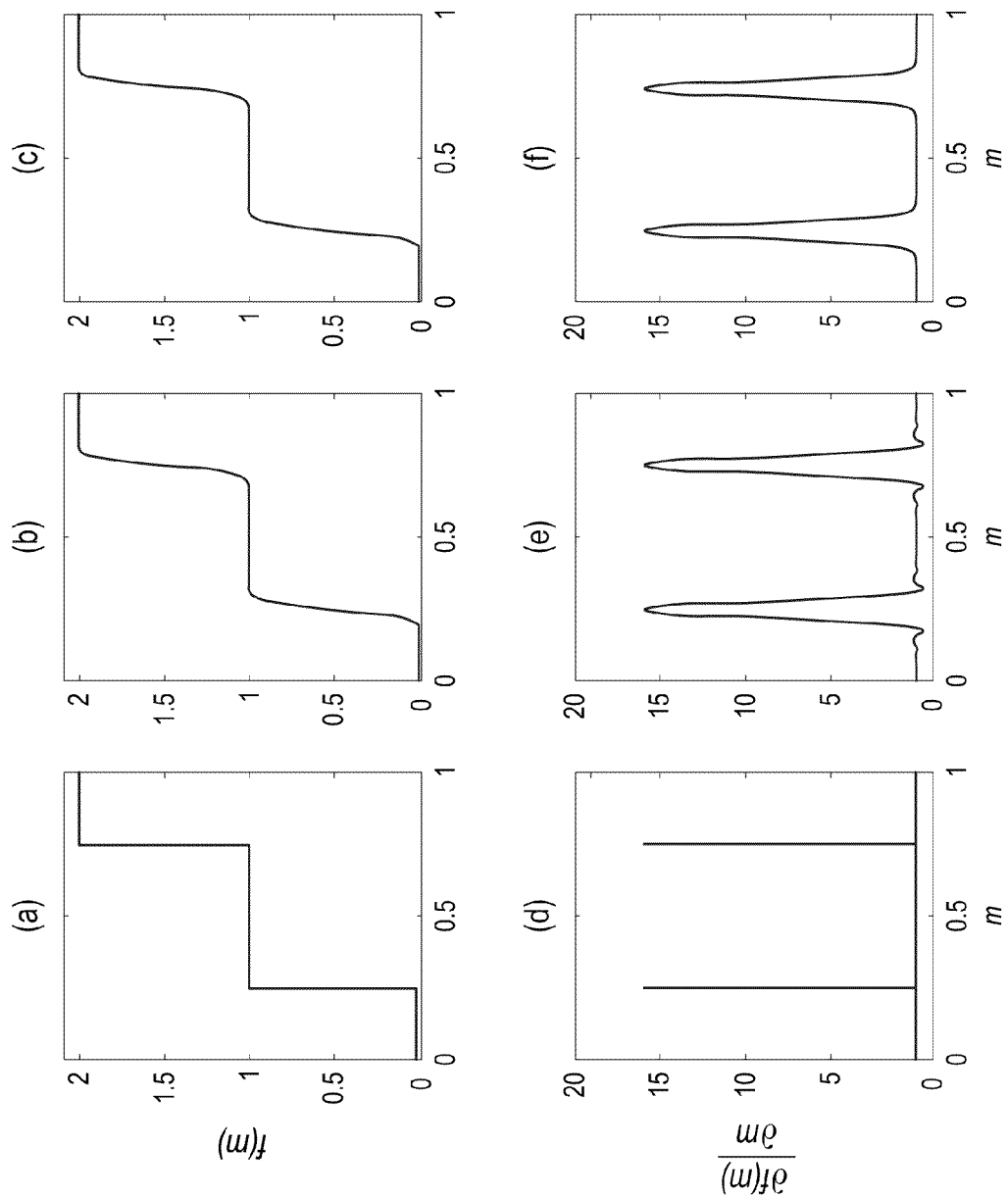
FIG. 2 illustrates different multinary functions, $f(m)$, that transform the continuum of physical properties, m, into discrete physical property categories.

The example is discussed with respect to FIG. 2. The upper panels of FIG. 2 present examples of multinary functions including (a) a Heaviside staircase function, (b) a band limited Heaviside staircase function, and (c) an error staircase function. The derivative of the multinary function with respect to the physical property, m, is a known function. The lower panels of FIG. 2 present the derivatives of the aforementioned multinary functions with respect to the physical property, m. (d) The derivative of the Heaviside staircase function is a superposition of the delta functions. (e) The derivative of the band limited Heaviside staircase function is a superposition of band limited delta functions. (f) The derivative of the error staircase function is a superposition of the Gaussian functions.

In general, we can consider imaging as the operator relationship:

$$d = A(m), \quad (1)$$

where d is the $N_d$ length vector of observed data, m is the $N_m$ length vector of model parameters, and A is a modeling operator, which may be linear or nonlinear. As discussed by Zhdanov, 2002, 2009, inversion of equation (1) is ill-posed, and its solution requires regularization.

Inverse problem (1) can be solved using the Tikhonov parametric functional with a pseudo-quadratic stabilizer:

$$p^\alpha(m) = \phi(m) + \alpha s(m) \to \min, \quad (2)$$

where $\phi(m)$ is a misfit functional:

$$\phi(m) = \|W_d A m - W_d d\|_D^2, \quad (3)$$

with $W_d$ being the diagonal data weighting matrix, and $s(m)$ is a stabilizing functional, which can be selected from variety of smooth and/or focusing stabilizing functionals. The regularization parameter, $\alpha$, is introduced to provide balance (or bias) between the misfit and stabilizing functionals.

In state-of-the-art inversion discussed by Zhdanov 2002, 2009, the physical properties can accept any value within known (or physical) bounds.

In at least one embodiment of a method disclosed herein, the model transform:

$$\tilde{m} = f(m), \quad (4)$$

is introduced such that the physical properties may be described by functions with a discrete number of values:

$$\tilde{m}_i = \{\tilde{m}_i^{(1)}, \tilde{m}_i^{(2)}, \ldots, \tilde{m}_i^{(P)}\}, \quad (5)$$

where $\tilde{m}$ is called a multinary function of order $P$.

In at least one embodiment of a method disclosed herein, the multinary function (4) is chosen such that the derivative $\partial \tilde{m}/\partial m$ is continuous and a known function so that Fréchet derivatives (sensitivities) of the data to the multinary model parameters can be evaluated analytically:

$$\delta d(\tilde{m}) = \delta d(m) \times \left(\frac{\partial \tilde{m}}{\partial m}\right)^{-1} \delta \tilde{m}, \quad (6)$$

thus enabling the parametric functional (2) to be minimized using any of the deterministic (gradient-based) optimization methods and related regularization techniques discussed by Zhdanov (2002, 2009).

In at least one embodiment of a method disclosed herein, the multinary function can be described by the steps of the staircase function:

$$\tilde{m}_i = c m_i + \Sigma_{j=1}^P H(m_i - m_i^{(j)}), \quad (7)$$

where $c$ is a small constant to avoid singularities in expression (6), and:

$$H(m_i - m_i^{(j)}) = \begin{cases} 0, & m_i < m_i^{(j)}, \\ 0.5, & m_i = m_i^{(j)}, \\ 1, & m_i > m_i^{(j)}, \end{cases} \quad (8)$$

is a Heaviside function (FIG. 2a). For example, in FIG. 2a, the steps of the staircase function have three values: 0, 1, and 2. The inverse transform also exists:

$$m_i = f^{-1}(\tilde{m}) = \begin{cases} c, & \text{if } \tilde{m}_i < 1, \\ c + m_i^{(j)}, & \text{if } j < \tilde{m}_i < j+1. \end{cases} \quad (9)$$

The derivative of equation (7) is a linear combination of delta functions (FIG. 2d):

$$\frac{\partial \tilde{m}_i}{\partial m} = c + \sum_{j=1}^P \delta(m_i - m_i^{(j)}). \quad (10)$$

The practical difficulty with multinary function (7) is that the derivative (10) has singularities which prevent the use of gradient-based optimization methods to minimize the parametric functional (2). This has been the reason for binary inversion practioners to use stochastic optimization methods for minimizing the parametric functional.

In at least one embodiment of a method disclosed herein, these aforementioned singularities can be avoided by introducing a band limited Heaviside function (FIG. 2b) as multinary function (4):

$$\tilde{m}_i = c m_i + \Sigma_{j=1}^P H_B(m_i - m_i^{(j)}), \quad (11)$$

where:

$$H_B(m_i - m_i^{(j)}) = \frac{1}{2\pi} \int_{-\infty}^{+\infty} T(\omega) \left[\pi \delta(\omega) - \frac{1}{i\omega}\right] e^{i\omega(m_i - m_i^{(j)})} d\omega, \quad (12)$$

where $T(\omega)$ is a symmetric and non-negative function characterizing the band limited filter in the frequency domain, such as a Tukey filter:

$$T(\omega) = \begin{cases} \frac{1}{2}\left(1 + \cos\left(\frac{\pi\omega}{\beta}\right)\right), & |\omega| \leq \beta, \\ 0, & |\omega| \geq \beta. \end{cases} \quad (13)$$

The continuous derivative of equation (11) as the superposition of band limited delta functions (FIG. 1e):

$$\frac{\partial \tilde{m}_i}{\partial m} = c + \sum_{j=1}^P \delta_B(m_i - m_i^{(j)}), \quad (14)$$

where:

$$\delta_B(m_i - m_i^{(j)}) = \frac{1}{2\pi} \int_{-\infty}^{+\infty} T(\omega) e^{-i\omega(m_i - m_i^{(j)})} d\omega. \quad (15)$$

In at least one embodiment of a method disclosed herein, the mutlinary function (4) may be described by error functions (FIG. 2c):

$$\tilde{m}_i = c m_i + \frac{1}{P} \sum_{j=1}^P E(m_i - m_i^{(j)}), \quad (16)$$

where:

$$E(m_i - m_i^{(j)}) = \text{erf}\left(\frac{m_i - m_i^{(j)}}{\sqrt{2}\,\sigma_i}\right), \quad (17)$$

such that the derivative is a superposition of Gaussian functions (FIG. 2f):

$$\frac{\partial \tilde{m}_i}{\partial m} = c + \frac{1}{P} \sum_{j=1}^{P} G(m_i - m_i^{(j)}), \quad (18)$$

where:

$$G(m_i - m_i^{(j)}) = \frac{1}{\sqrt{2\pi}\sigma_i} e^{-\frac{(m_i - m_i^{(j)})}{2\sigma_i^2}}. \quad (19)$$

In at least one embodiment of a method disclosed herein, mutlinary function (17) can be interpreted with a statistical analogy, where the Gaussian function (19) represents the probability density distribution function of each discrete physical property $m_i$ with the mean value $m_i^{(j)}$ and the standard deviation $\sigma_i$. Multinary function (17) can then be interpreted as a cumulative density function of the physical properties.

In at least one embodiment of this method, a priori information can be applied to the spatial distribution of the discrete physical property categories within the 3D model. For example, in geophysical imaging, the different discrete physical property categories may relate to different lithological units which obey geological rules to satisfy the chronological order of a stratigraphic column.

In at least one embodiment of this method, the parametric functional may be inclusive of multi-modal data, and can be applied to the 3D simultaneous joint inversion of multi-modal data to at least one physical property such with the methodology described by Zhdanov, Gribenko, and Wilson (2012).

At least one embodiment of this method can be applied in real-time.

EXAMPLE 2

The following is an example of at least some of the principles of multinary inversion that is offered to assist in the practice of the disclosure. It is not intended to thereby limit the scope of the disclosure to any particular theory of operation or to any field of operation.

The following example is for an airborne electromagnetic system, represented as a time-domain electromagnetic system with a half-sine transmitter waveform operated at a 90 Hz base frequency, for which the inductive source is mounted on a fixed-wing aircraft flown at a 120 m flight height above the surface of the earth, and inductive sensors are mounted in a bird that is towed 120 m behind and 35 m below the fixed-wing aircraft and measure the inline and vertical vector components of the magnetic field impulse response (dB/dt).

Figure 3:
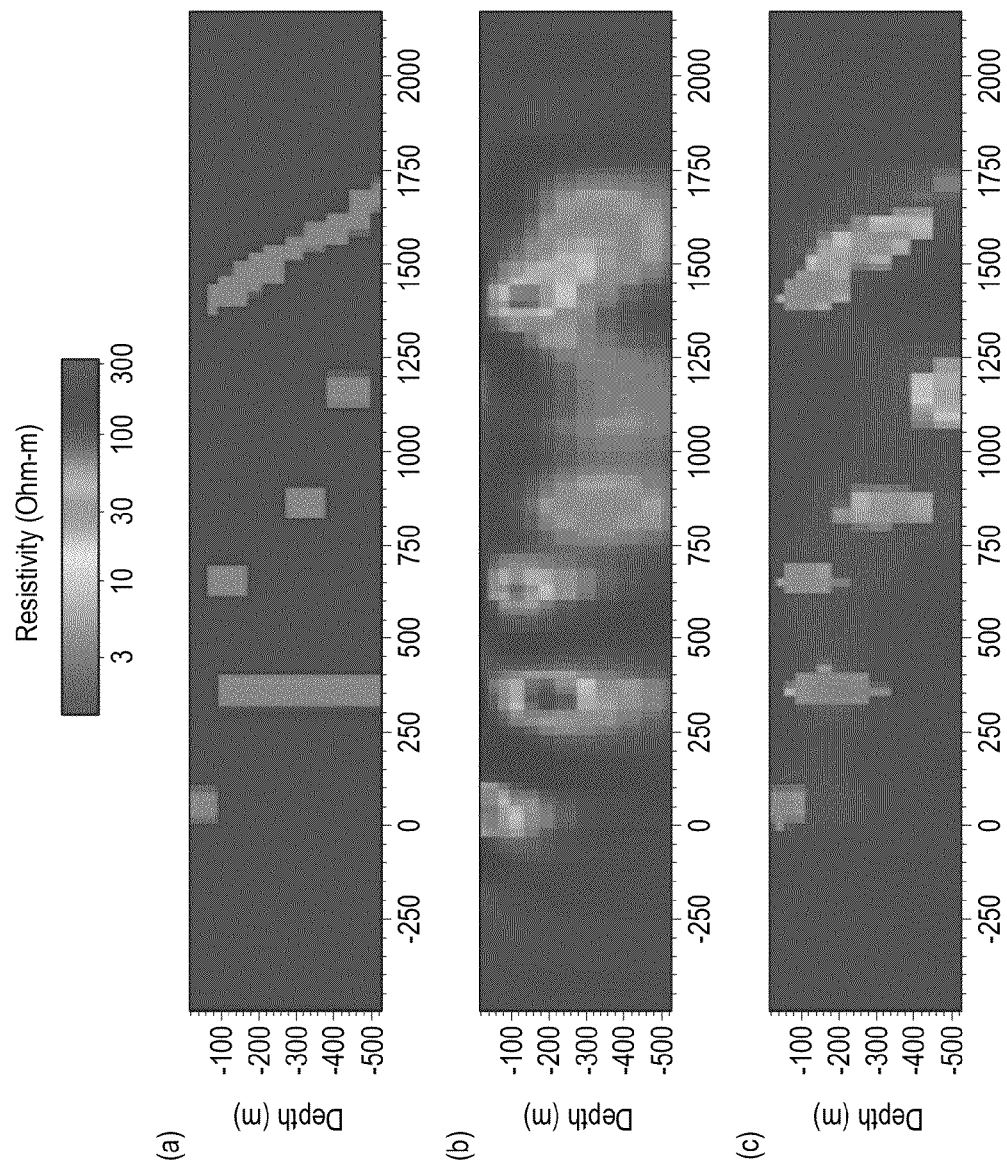
FIG. 3a illustrates a synthetic 3D earth model consisting of several discrete, conductive targets.
FIG. 3b illustrates a 3D resistivity model recovered from regularized inversion with focusing stabilizers.
FIG. 3c illustrates a 3D resistivity model recovered using a method of multinary inversion as applied to a 3D regularized inversion method for airborne electromagnetic data.

As shown in FIG. 3a, the 3D earth model consisted of several discrete, conductive targets of 10 ohm-m resistivity embedded at various depths and dips, embedded in an otherwise homogeneous geological formation of 100 ohm-m resistivity. Synthetic electromagnetic data for the aforementioned described airborne electromagnetic system were simulated using the 3D modeling methods described by Cox, Wilson, and Zhdanov (2012).

The synthetic electromagnetic data were inverted using the state-of-the-art 3D regularized inversion method for airborne electromagnetic data described by Cox, Wilson, and Zhdanov (2012). The inversion converged to a weighted misfit less than 1%. As shown in FIG. 3b, a 3D resistivity model was recovered with a continuum of resistivity values. In comparison to the actual resistivity model shown in FIG. 3a, note that all of the targets are identified, yet some of the targets are diffuse and under-estimate the actual resistivity of the targets.

The synthetic electromagnetic data were inverted using multinary inversion. An error staircase function-based multinary function was applied to the physical property (resistivity) in the state-of-the-art 3D regularized inversion method for airborne electromagnetic data described by Cox, Wilson, and Zhdanov (2012). No other modifications were made to the 3D regularized inversion method for airborne electromagnetic data described by Cox, Wilson, and Zhdanov (2012). To image the discrete physical properties, a multinary function was created using error functions that defined one discrete physical property with a resistivity of 10 ohm-m (corresponding to the target), and the second discrete physical property with a resistivity of 100 ohm-m (corresponding to the host). The inversion converged to a weighted misfit less than 1%. As shown in FIG. 3c, a 3D resistivity model was recovered with discrete resistivity values representative of the actual 3D resistivity model shown in FIG. 3a.

EXAMPLE 3

The following is another example of at least some of the principles of multinary inversion that is offered to assist in the practice of the disclosure. It is not intended to thereby limit the scope of the disclosure to any particular theory of operation or to any field of operation.

The following example is for airborne gravity gradiometry, represented as a full tensor gravity gradiometry system installed on an airborne platform flown at a 15 m flight height above the surface of the earth.

Figure 4:
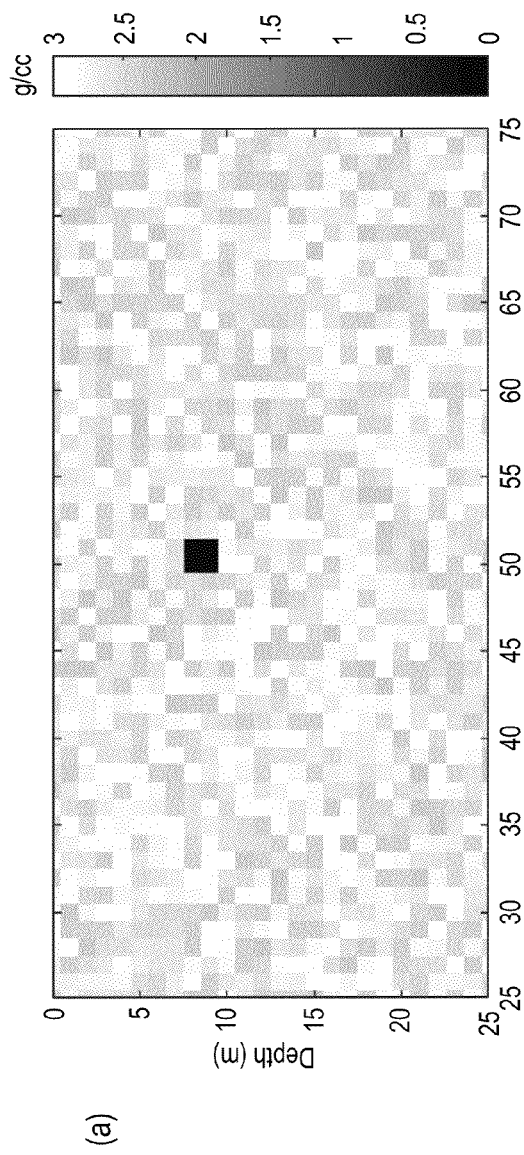
FIG. 4a illustrates a synthetic 3D earth model.
FIG. 4b illustrates a 3D density model recovered using a method of multinary inversion as applied to a 3D regularized inversion method for airborne gravity gradiometry data.
Figure 4:
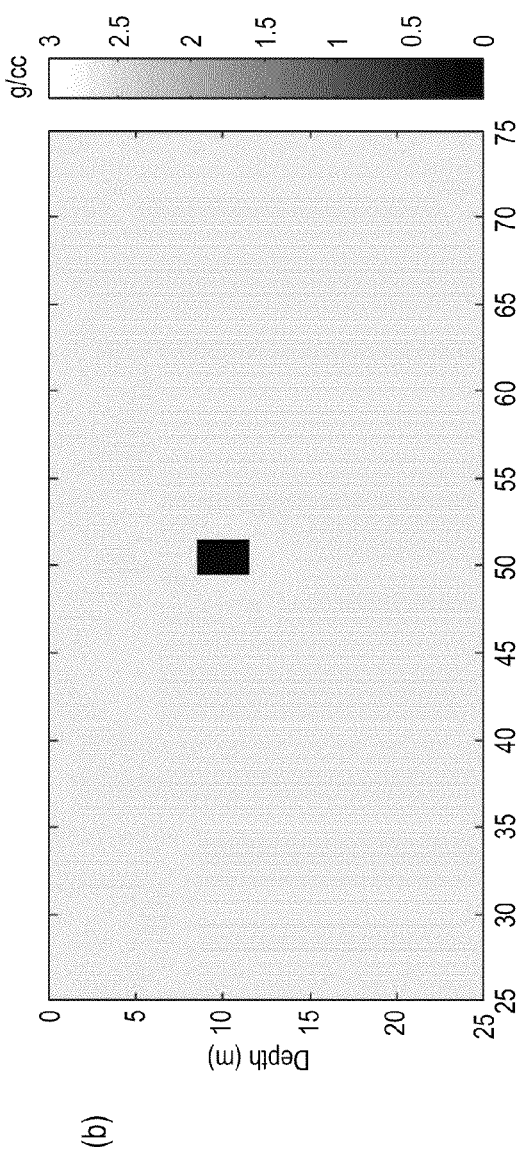

As shown in FIG. 4a, the 3D earth model consisted of a 2 m×2 m tunnel at 8 m depth below the earth's surface is illustrated. The tunnel represents a discrete target with a density of 0.00 g/cc. The tunnel is embedded in a geological formation with a density of 2.67 g/cc. The earth model was randomly perturbed by a ±0.30 g/cc density variation to emulate geological noise. Synthetic full tensor gravity gradiometry data for the aforementioned described airborne gravity gradiometry system were simulated using the 3D modeling methods described by Zhdanov, Ellis, and Mukherjee (2004).

The synthetic full tensor gravity gradiometry data were inverted using multinary inversion. An error staircase function-based multinary function was applied to the physical property (resistivity) in the state-of-the-art 3D regularized inversion method for airborne gravity gradiometry data described by Zhdanov, Ellis, and Mukherjee (2004). No other modifications were made to the 3D regularized inversion method for airborne gravity gradiometry data described by Zhdanov, Ellis, and Mukherjee (2004). To image the discrete physical properties, a multinary function was created using error functions that defined one discrete physical property with a density of 0.00 g/cc (corresponding to the tunnel), and the second discrete physical property with a density of 2.67 g/cc (corresponding to the host). As shown in FIG. 4b, a 3D density model was recovered with the tunnel's location and discrete density values representative of the actual 3D density model shown in FIG. 4a. Note that 3D image recovered by the method is robust relative to the geological noise in the actual 3D density model.

EXAMPLE 4

The following is yet another example of at least some of the principles of multinary inversion that is offered to assist in the practice of the disclosure. It is not intended to thereby limit the scope of the disclosure to any particular theory of operation or to any field of operation.

The following example is for an airborne electromagnetic system, represented as a frequency-domain electromagnetic system operated at 10 kHz, 50 kHz, and 100 kHz, for which the inductive source is mounted on an airborne platform flown at a 15 m flight height above the surface of the earth, and capacitive sensors are mounted 8 m behind the inductive source on the same airborne platform, and measure the three vector components of the electric field.

Figure 5:
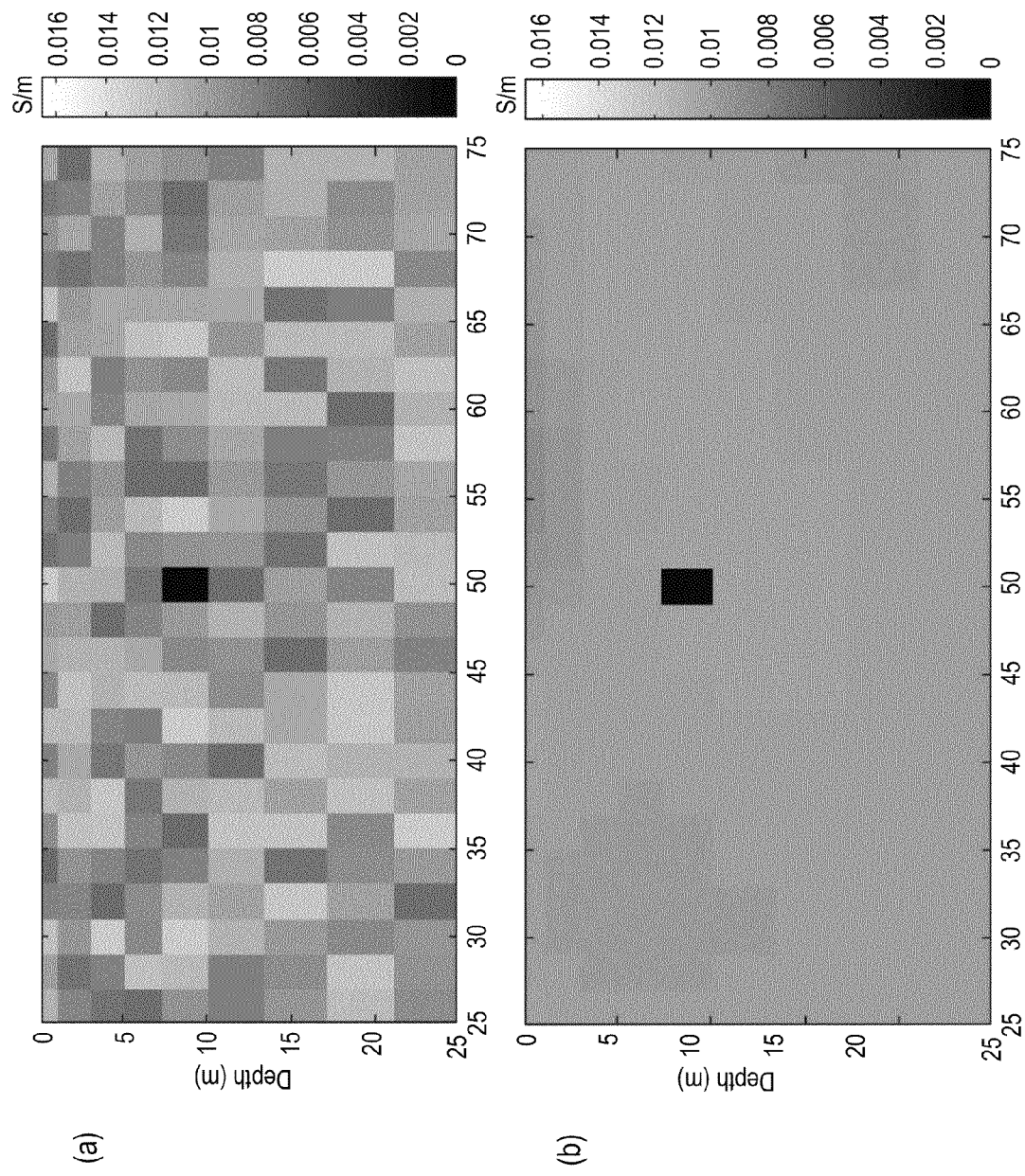
FIG. 5a illustrates a synthetic 3D earth model.
FIG. 5b illustrates the 3D resistivity model recovered using the method of multinary inversion as applied to a 3D regularized inversion method for airborne electromagnetic data.

As shown in FIG. 5a, the 3D earth model consisted of a 2 m×2 m tunnel at 8 m depth below the earth's surface. The tunnel represents a discrete target with a resistivity of $10^8$ ohm-m. The tunnel is embedded in a geological formation with a resistivity of 100 ohm-m. The earth model was randomly perturbed by a 50 ohm-m resistivity variation to emulate geological noise. Synthetic electromagnetic data for the aforementioned described airborne electromagnetic system were simulated using the 3D modeling methods described by Cox, Wilson, and Zhdanov (2012).

The synthetic electromagnetic data were inverted using multinary inversion. An error staircase function-based multinary function was applied to the physical property (resistivity) in the state-of-the-art 3D regularized inversion method for airborne electromagnetic data described by Cox, Wilson, and Zhdanov (2012). No other modifications were made to the 3D regularized inversion method for airborne electromagnetic data described by Cox, Wilson, and Zhdanov (2012). To image the discrete physical properties, a multinary function was created using error functions that defined one discrete physical property with a resistivity of $10^8$ ohm-m (corresponding to the tunnel), and the second discrete physical property with a resistivity of 100 ohm-m (corresponding to the host). As shown in FIG. 5b, a 3D resistivity model was recovered with the tunnel's location and discrete resistivity values representative of the actual 3D resistivity model shown in FIG. 5a. Note that 3D image recovered by the method is robust relative to the geological noise in the actual 3D resistivity model.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical non-transitory storage media. Computer-readable media that carry computer-executable instructions are transmission media. Thus, by way of example, and not limitation, embodiments of the invention can comprise at least two distinctly different kinds of computer-readable media: physical non-transitory storage media and transmission media.

Physical non-transitory storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method of multinary inversion for imaging of physical properties of an examined medium characterized by discrete physical property values, the method comprising:
   a. placing a data acquisition system in proximity of a target area of the examined medium, and acquiring and processing observed data related to the target area;
   b. selecting a multinary function that accepts a finite number of discrete values from physical property values of the target area, and which characterizes a set of discrete values of the physical properties of the target area;
   c. emulating the data acquisition system and its parameters by a forward modeling calculation of predicted data related to the target area;
   d. calculating a misfit functional and a residual vector between the observed data and the predicted data;
   e. calculating stabilizing functionals for model parameters and calculating Fréchet derivatives (sensitivities) of the observed data with respect to the multinary model parameters;
   f. solving a multinary inverse problem by minimizing a parametric functional formed by a linear combination of the misfit and stabilizing functionals;
   g. evaluating termination criteria of the multinary inverse problem; and
   h. calculating physical property values to produce intermediate and/or final images of the examined medium.

2. The method of claim 1, wherein the physical property comprises one of electrical conductivity, dielectric permittivity, induced polarization parameters, density, magnetization, susceptibility, compressional wave velocity, acoustic impedance, and/or shear wave velocity, and/or any combination thereof, representing the physical properties of the examined medium.

3. The method of claim 1, wherein the examined medium is a geological formation.

4. The method of claim 1, wherein the examined medium is a human and/or animal body.

5. The method of claim 1, wherein the examined medium is a man-made object.

6. The method of claim 1, wherein the target area is characterized by different physical properties including one or more of conductivity, permeability, induced polarization parameters, density, magnetization, magnetic susceptibility, compressional wave velocity, shear wave velocity, and/or any combination thereof; and wherein the data acquisition system collects multi-modal data representing different physical properties of the examined medium.

7. The method of claim 1, wherein the stabilizing functionals for model parameters include any smooth or focusing stabilizing functions such as Laplacian, minimum gradient, minimum norm, minimum support, or minimum gradient support.

8. The method of claim 1, wherein termination criteria of the multinary inverse problem includes a predetermined misfit being achieved.

9. A physical non-transitory computer readable medium having stored thereon computer executable instructions that when executed by a processor cause a computing system to perform a method of multinary inversion for imaging of physical properties of an examined medium characterized by discrete physical property values, the method comprising:
   a. acquiring and processing observed data related to a target area of the examined medium;
   b. selecting a multinary function that accepts a finite number of discrete values from physical property values of the target area, and which characterizes a set of discrete values of the physical properties of the target area;
   c. emulating a data acquisition system and its parameters by a forward modeling calculation of predicted data related to the target area;
   d. calculating a misfit functional and a residual vector between the observed data and the predicted data;
   e. calculating stabilizing functionals for model parameters and calculating Fréchet derivatives (sensitivities) of the observed data with respect to the multinary model parameters;
   f. solving a multinary inverse problem by minimizing a parametric functional formed by a linear combination of the misfit and stabilizing functionals;
   g. evaluating termination criteria of the multinary inverse problem; and
   h. calculating physical property values to produce intermediate and/or final images of the examined medium.

10. The computer readable medium of claim 9, wherein the physical property comprises one of electrical conductivity, dielectric permittivity, induced polarization parameters, density, magnetization, susceptibility, compressional wave velocity, acoustic impedance, and/or shear wave velocity, and/or any combination thereof, representing the physical properties of the examined medium.

11. The computer readable medium of claim 9, wherein the target area is characterized by different physical properties including one or more of conductivity, permeability, induced polarization parameters, density, magnetization, magnetic susceptibility, compressional wave velocity, shear wave velocity, and/or any combination thereof.

12. The computer readable medium of claim 9, wherein the examined medium is one of a geological formation, a human and/or animal body, or a man-made object.

13. A system for multinary inversion for imaging of physical properties of an examined medium characterized by discrete physical property values comprising:
   a data acquisition system configured to obtain data related to a target area of the examined medium; and
   a computing system, the computing system comprising:
      a processor; and
      one or more physical non-transitory computer readable medium having computer executable instructions stored thereon that when executed by the processor, cause the computing system to perform:
   a. acquiring and processing observed data related to the target area;
   b. selecting a multinary function that accepts a finite number of discrete values from physical property values of the target area, and which characterizes a set of discrete values of the physical properties of the target area;
   c. emulating a data acquisition system and its parameters by a forward modeling calculation of predicted data related to the target area;
   d. calculating a misfit functional and a residual vector between the observed data and the predicted data;
   e. calculating stabilizing functionals for model parameters and calculating Fréchet derivatives (sensitivities) of the observed data with respect to the multinary model parameters;
   f. solving a multinary inverse problem by minimizing a parametric functional formed by a linear combination of the misfit and stabilizing functionals;
   g. evaluating termination criteria of the multinary inverse problem; and
   h. calculating physical property values to produce intermediate and/or final images of the examined medium.

14. The system of claim 13, wherein the physical property comprises one of electrical conductivity, dielectric permittivity, induced polarization parameters, density, magnetization, susceptibility, compressional wave velocity, acoustic impedance, and/or shear wave velocity, and/or any combination thereof, representing the physical properties of the examined medium.

15. The system of claim 13, wherein the examined medium is a geological formation.

16. The system of claim 13, wherein the examined medium is a human and/or animal body.

17. The system of claim 13, wherein the examined medium is a man-made object.

18. The system of claim 13, wherein the target area is characterized by different physical properties including one or more of conductivity, permeability, induced polarization parameters, density, magnetization, magnetic susceptibility, compressional wave velocity, shear wave velocity, and/or any combination thereof; and wherein the data acquisition system collects multi-modal data representing different physical properties of the examined medium.

19. The system of claim 13, wherein the stabilizing functionals for model parameters include any smooth or focusing stabilizing functions such as Laplacian, minimum gradient, minimum norm, minimum support, or minimum gradient support.

20. The system of claim 13, wherein termination criteria of the multinary inverse problem includes a predetermined misfit being achieved.

* * * * *